A. H. JURK.
FENDER.
APPLICATION FILED FEB. 29, 1916.

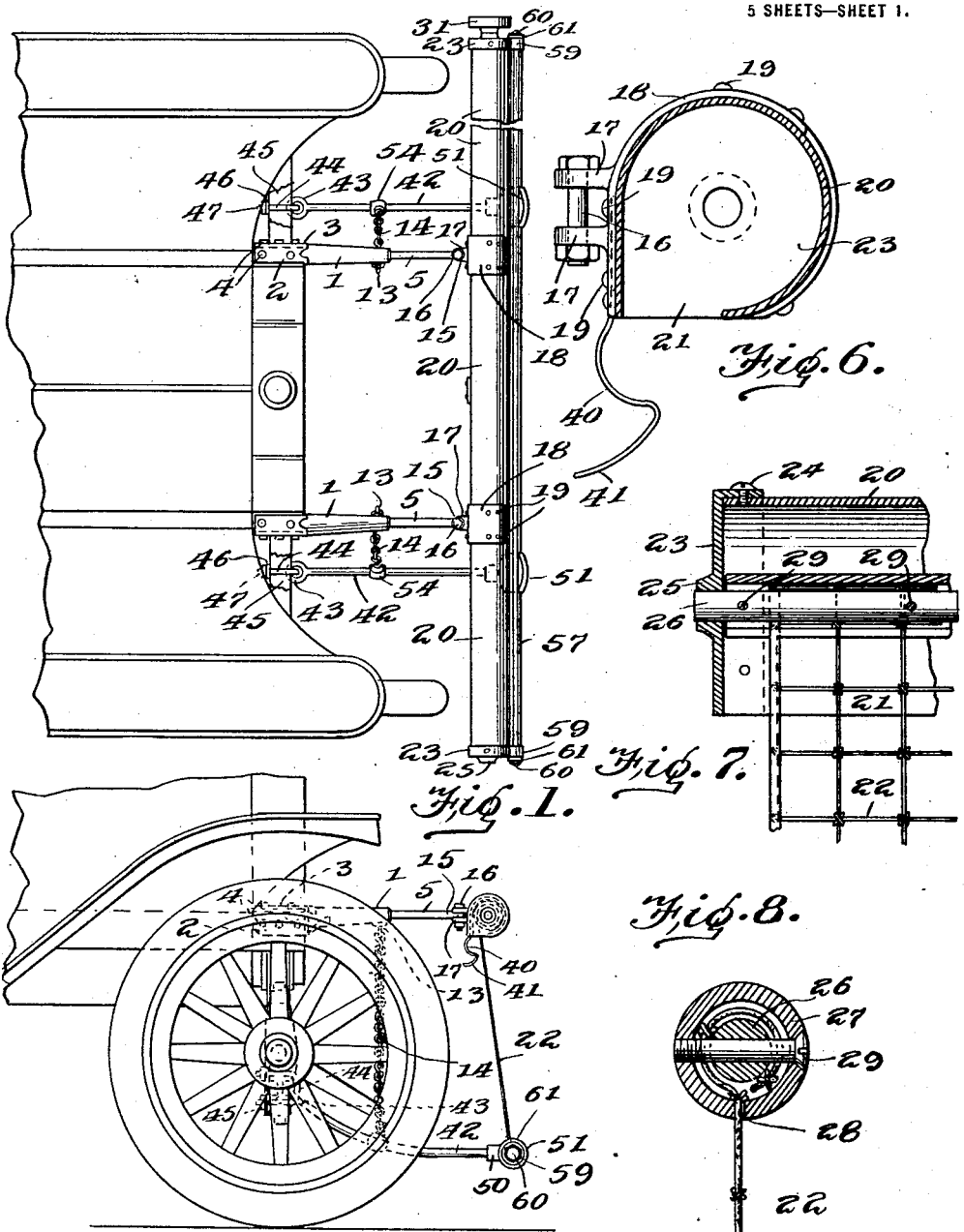

1,220,134.

Patented Mar. 20, 1917.
5 SHEETS—SHEET 2.

Witnesses
H. N. Lybrand
P. M. Smith

Inventor
August H. Jurk
By Victor J. Evans
Attorney

A. H. JURK.
FENDER.
APPLICATION FILED FEB. 29, 1916.
1,220,134.
Patented Mar. 20, 1917.
5 SHEETS—SHEET 3.
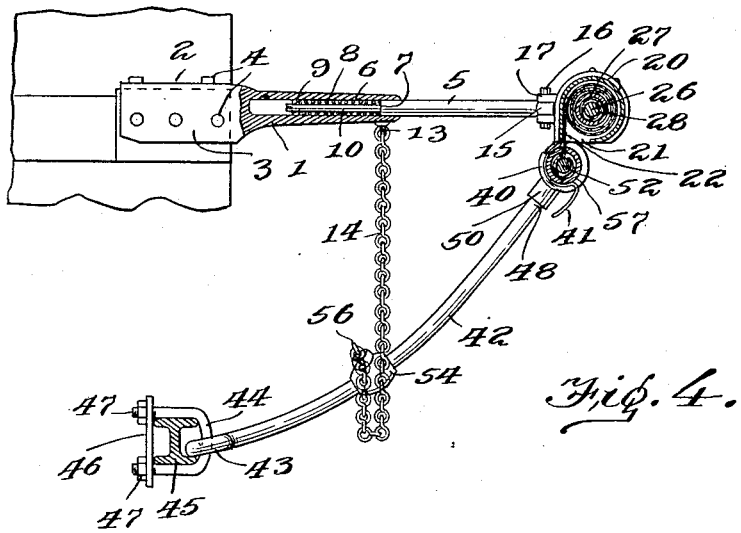
Fig. 4.
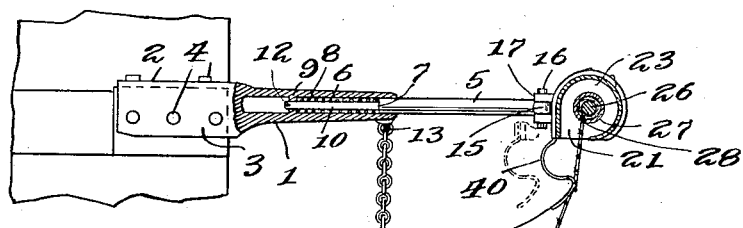
Fig. 5.
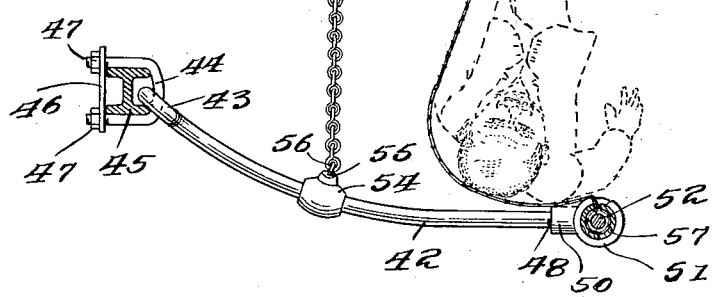
Inventor
August H. Jurk
By Victor J. Evans
Attorney
Witnesses
H. N. Lybrand
R. M. Smith

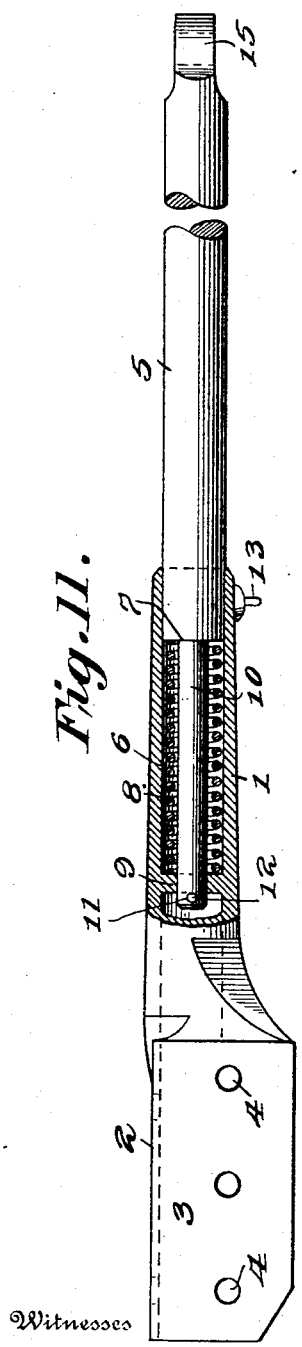
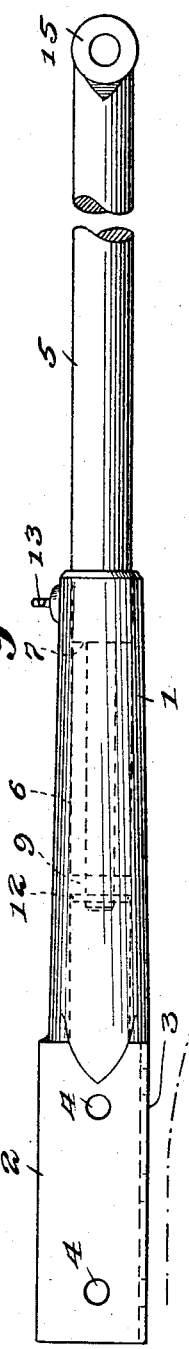
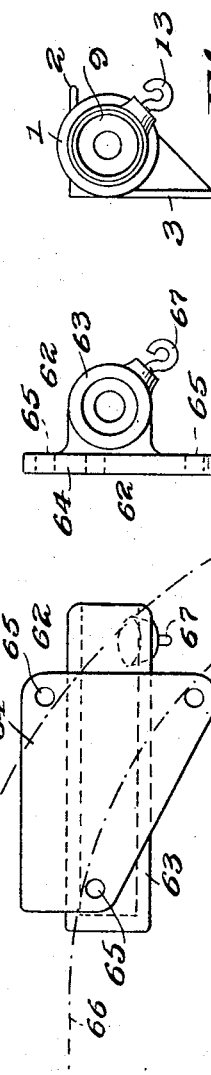
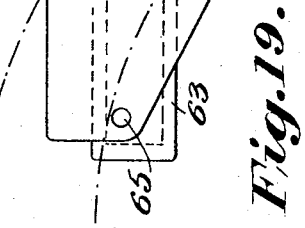

A. H. JURK.
FENDER.
APPLICATION FILED FEB. 29, 1916.
1,220,134.
Patented Mar. 20, 1917.
5 SHEETS—SHEET 5.
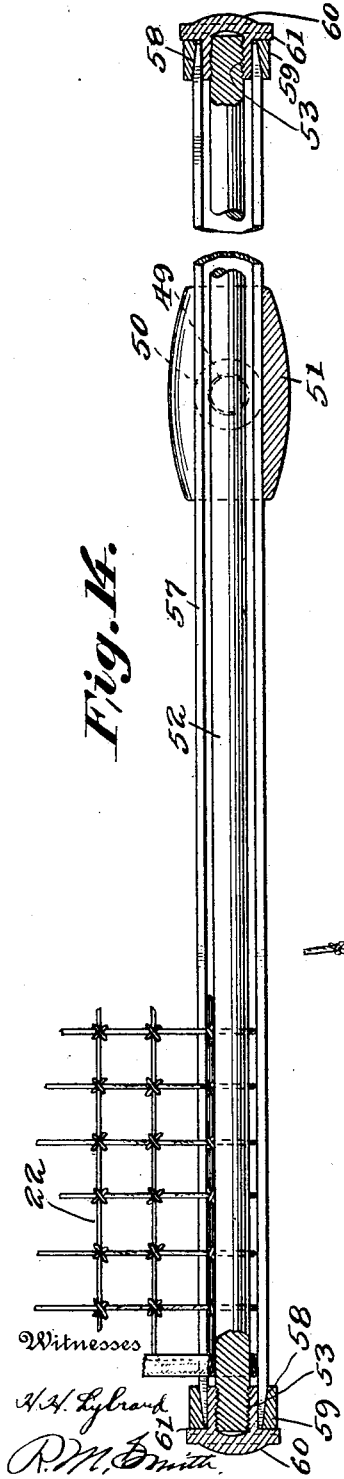
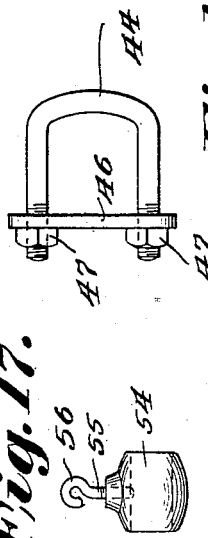
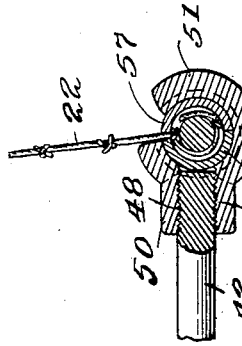
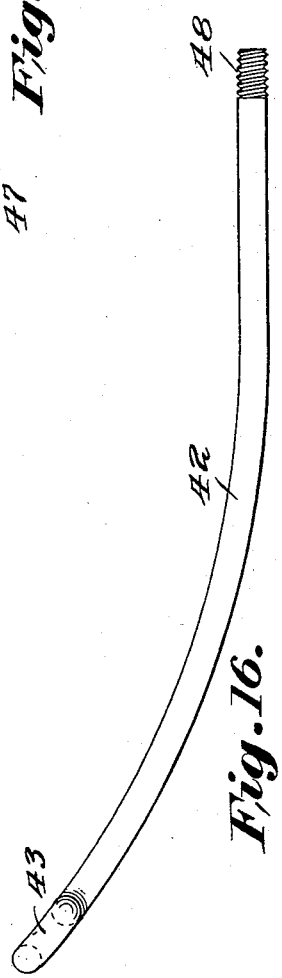
Inventor
August H. Jurk
By Victor J. Evans
Attorney
Witnesses

UNITED STATES PATENT OFFICE.

AUGUST H. JURK, OF BUFFALO, NEW YORK.

FENDER.

1,220,134.  Specification of Letters Patent.  Patented Mar. 20, 1917.

Application filed February 29, 1916. Serial No. 81,196.

*To all whom it may concern:*

Be it known that I, AUGUST H. JURK, a citizen of the United States residing at Buffalo, in the county of Erie and State of New York, have invented new and useful Improvements in Fenders, of which the following is a specification.

This invention relates to fenders and while especially designed for use upon motor driven vehicles such as automobiles, motor trucks and the like, the fender of this invention is also equally well adapted for use on street and interurban cars.

The object of this invention is to produce a practical, reliable and sightly fender which, in its normal carrying position is compact and takes up very little space, the fender being adapted to be automatically tripped by coming in contact with a person or object and having means whereby it is adapted to automatically spread a flexible apron or curtain which picks up said person or object and carries the same, preventing the wheels from passing over such person or object.

A further object in view is to provide a fender of the general character referred to in which the parts which must necessarily come in contact with a person or object are resilient and shock-absorbing thereby reducing the liability of injuring any person struck by the fender.

It is also an object of the present invention to provide a simple and economical construction of fender, a fender which is easy to operate and which may be easily readjusted or folded and which will remain securely in its folded position so as not to be dislodged and spread by ordinary road shocks and vibrations or by the sudden stopping and starting of the motor vehicle by which the fender is carried.

With the above and other objects in view, the invention consists in the novel construction, combination and arrangement of parts, as herein described, illustrated and claimed.

In the accompanying drawings:—

Figure 1 is a plan view of the fender applied to an automobile.

Fig. 2 is a side elevation of the same showing the fender apron in its catching position.

Fig. 4 is a vertical longitudinal section showing the fender apron housed in its casing.

Fig. 5 is a similar view showing the apron spread and the fender as a whole in catching position.

Fig. 6 is an enlarged vertical transverse section through the apron casing, showing one of the holders therefor.

Fig. 7 is a sectional view of one of the end caps of the casing and the relation of the body of the casing and the apron roller thereto.

Fig. 8 is an enlarged fragmentary cross section through the apron roller and shaft.

Fig. 11 is a side elevation of one of the main supports.

Fig. 12 is a top plan view of the same.

Fig. 13 is a front end view thereof.

Fig. 14 is a longitudinal sectional view of the front cross rod and the shock absorbing tube and other parts connected therewith.

Fig. 15 is a cross section through the same taken in line with one of the clamps.

Fig. 16 is a detail view of one of the pivoted apron stretching arms.

Fig. 17 is a detail view of one of the lower chain holding clamps.

Fig. 18 is a side elevation of one of the attaching clips, showing the front axle in cross section.

Fig. 19 is a side elevation of another form of support adapted for attachment to the frame of a vehicle.

Fig. 20 is an end view of the same.

Figure 3:
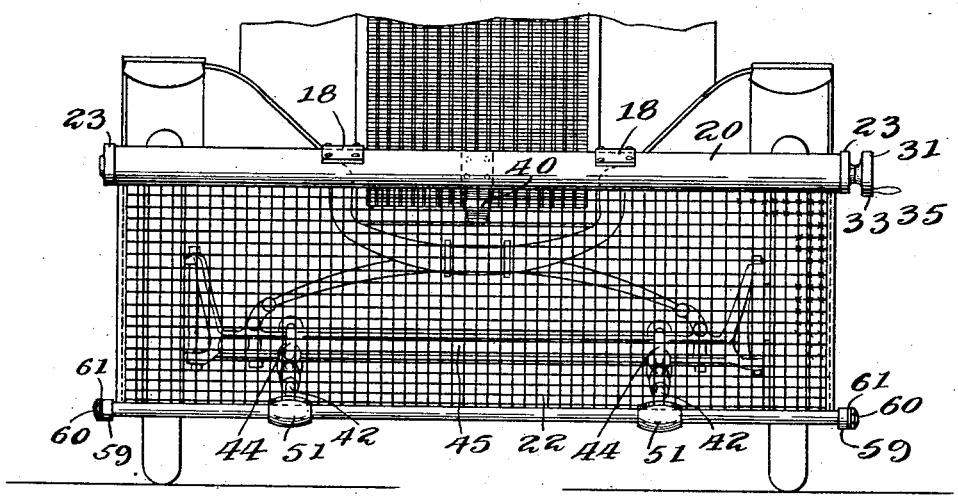
Fig. 3 is a front elevation of the same.
Figures 9, 10:
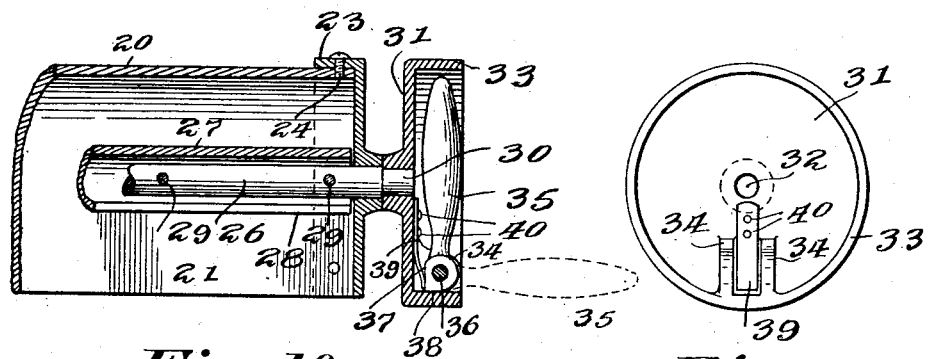
Fig. 9 is an outside face view of the crank handle housing.
Fig. 10 is a diametrical section through the same illustrating the relation of the crank handle thereto.

In carrying out the present invention, I employ a pair of main supports 1 each of which is of tubular formation throughout the greater portion of its length and provided at the rear end thereof with a top flange 2 and a side flange 3, said flanges being formed with holes 4 to receive bolts or rivets by means of which the support is fixedly secured to the adjacent frame bar of the machine.

5 represents a pair of supporting rods each of which is slidable longitudinally within the bore 6 of the respective support 1 in a substantially horizontal plane. Each rod 5 is reduced along its rear portion to form a spring seat or shoulder 7 and a coiled expansion cushioning spring 8 is interposed between the shoulder 7 and an internal annular shoulder or flange 9 in the bore 6 of the support, the reduced rear end portion 10 of the rod 5 extending through the flange 9 and in rear thereof where it is provided with a hole 11 to receive a pin or stop 12 adapted to bear against the rear side of the flange 9 to limit the forward thrust of the rod 5 under the action of the spring 8. At its forward extremity each support 1 is provided with a hook 13 to which the upper end portion of one of a pair of stay chains 14 is connected, said chains being employed to limit the downward movement of the apron stretching arms hereinafter described.

Each of the rods 5 is provided at its forward extremity with an eye 15 to receive one of a pair of bolts 16 inserted vertically through lugs 17 arranged in spaced relation to each other and extending rearwardly from curved holders 18 which are fastened exteriorly at 19 to a flexible shock absorbing apron casing 20 of spring metal, said casing extending across the front of the machine and being preferably of such length as to also extend in front of the wheels and mud guards of the vehicle. The casing 20 is so formed as to leave a slot or opening 21 in the bottom thereof through which the apron 22 preferably in the form of a net is capable of being withdrawn from its roller contained within the casing 20. The casing 20 is thus supported at two points by the rods 5 and is adapted to yield rearwardly and is at the same time cushioned by the springs 8 above referred to.

At its opposite ends the casing 20 is closed by means of end caps 23 fastened thereto at 24 and having outwardly extended bearing bosses 25 for the shaft 26 of an apron roller 27, the latter being of tubular formation as shown in Fig. 8, the roller 27 being formed with a longitudinal slot 28 extending throughout the length thereof to enable the upper marginal edge of the apron 22 to be inserted therein and passed around the shaft 26, the roller 27 and the shaft 26 being fastened firmly together by means of screws 29 or their equivalent inserted through registering holes in the parts 26 and 27. The shaft 26 is of greater length than the roller 27 and the ends of said shaft are received in the bearings formed in the bosses 25. One end of the shaft 26 is extended beyond the respective boss 25 where it is squared or otherwise formed as shown at 30 to receive a cylindrical housing 31 which has a central opening 32 corresponding to the shape of the squared end 30 of the shaft 26, said housing 31 being thus fastened to the shaft 26 so as to turn therewith. The outer side of the housing 31 is open and is provided within the rim 33 thereof with lugs 34 between which is pivotally mounted an end crank 35, 36 designating a pin which is inserted through the lugs 34 and the hand crank 35. The crank 35 is formed with flat faces 37 and 38 both of which are adapted to be engaged by a spring 39 fastened at 40 to the housing 31, said spring 39 acting in conjunction with the flat faces 37 and 38 to hold the hand crank 35 either within the housing 31 or at a right angle thereto. The device just described is used for rewinding the apron upon its roller in restoring the fender as a whole to its folded or elevated position.

Secured to the rear side of the housing 20 is a spring hook 40 which serves to uphold the cross rod hereinafter described and it is located at the lower margin of the apron. The lower end portion of the hook 40 is reversely deflected as shown at 41 so that in rewinding the apron upon its roller, the said cross rod of the apron will displace the lower portion of the hook before snapping into engagement therewith so as to be upheld thereby.

42 represents a pair of apron stretching members or arms, the same being preferably curved as they appear in side elevation and being provided at their upper or rear extremities with eyes 43 each of which receives a U-shaped bolt or clip 44 embracing the front axle 45 of the vehicle and each secured in fixed relation thereto by means of a washer plate 46 and nuts 47. This forms a jointed or pivotal connection between each of the arms or members 42 and the vehicle axle. The arms 42 are threaded at their forward extremities as shown at 48 and are screwed into threaded openings 49 in rearwardly extending bosses 50 on a pair of clamps or holders 51, said clamps or holders receiving a cross rod 52 having its opposite extremities threaded at 53 for a purpose which will presently appear. Surrounding an intermediate portion of each of the members 42 is a collar 54 provided with a set screw 55 to fasten the same in place, said set screw being formed with an eye 56 to receive the lower end of one of the stay chains 14 above described. Surrounding the cross rod 52 is a shock absorbing tube 57 of metal, the same being split longitudinally and divided into twin sections as shown, which sections when combined have an internal diameter considerably in excess of the external diameter of the rod 52 to admit of the necessary flexure of the tube 57 to cushion the impact upon coming in contact with a person or object. The tube 57 is supported only at its extremities and for that purpose the opposite extremities of the tube are beveled or chamfered as shown at 58 to receive collars 59 having a tapered bore as shown so as to operate with a wedging effect on the extremities of the sections of the tube 57. The rod 52 extends through the collars 59 and receives internally threaded heads or nuts 60 which are threaded on the end portions 53 of the rod 52, the nuts or heads 60 being formed with circumferential flanges 61 which bear against the outer faces of the collars 59 and force the same inwardly so as to securely clamp the sections of the tube 57 together at the opposite ends thereof and support the opposite extremities of said tube in concentric relation to the rod 52.

Instead of the supports 1 hereinabove described, I may employ the supports 62 one of which is illustrated in Figs. 19 and 20. Each of said supports comprises the tubular body portion 63 adapted to receive one of the rods 5 hereinabove described and also adapted to contain one of the cushioning springs 8. The tubular body 63 has at one side thereof an attaching plate 64 provided with holes 65 to receive rivets or bolts whereby it is firmly secured in fixed relation to one of the frame bars 66 on the vehicle. The tubular body 63 is also provided at its forward extremity with a hook 67 to which one of the stay chains 14 may be connected, the hook 67 having the same function as the hook 13 previously described as applied to the support 1.

From the foregoing description, taken in connection with the accompanying drawings, the construction and operation of the fender will now be understood. Under normal running conditions, the flexible apron is wound upon its roller and contained within the casing 20 and the lower cross rod of the arms or members 42 is supported by means of the hook 40 thus holding the arms 42 in an elevated position to give ample road clearance. When the casing 20 strikes a person or object, the supporting rods 5 yield rearwardly under the cushioning action of the springs 8, thereby moving the hook 40 out of engagement with the tube 57 which surrounds the cross rod 52 at the lower margin of the apron. The weight of said tube, cross rod, and stretcher arms 42 causes the apron to be quickly unwound from the roller 27 thus quickly spreading the apron, the downward movement of which is limited by means of the stay chains 14. As these chains are of the link type, any desired link may be connected with the upper hooks 13 according to the character of the road way over which the vehicle is being operated. The apron is rewound on its roller within the casing 20 by means of the hand crank 25 which may be swung inwardly to its housed position after the apron has been rewound sufficiently to cause the tube 57 to snap into engagement with the spring hook 40.

When the fender is in its elevated position, the fender apron is concealed within the casing 20 thereby rendering the whole device attractive in appearance. The spreading of the fender is entirely automatic and is brought about by contact with a person or object, requiring no thought or action on the part of the driver of the vehicle. The operation of the device is reliable for that reason and will prevent a person being run over by the wheels of the vehicle or being struck by the mud guards. The chains provide for quickly adjusting the limit of downward movement of the fender in accordance with road conditions while the hook 40 prevents the untimely dropping of the fender when traveling over rough roads or making sudden stops and starts. The fender will safely carry a person until the operator has had sufficient time to bring the vehicle to a stop.

Having thus described my invention, I claim:—

1. In a fender, a flexible apron, a roller on which said apron is wound, a tubular casing in which said apron and its roller are contained, said casing having an opening through which the apron may be drawn, apron spreading arms pivotally supported at their rear ends and having the free margin of the apron connected therewith, a cross rod at the front extremities of said arms, means on said casing for engaging and upholding said cross rod when the apron is housed in said casing, supporting means for said casing permitting the latter upon contact with an object to yield backwardly and release said cross rod, and stay chains attached to said apron spreading arms and serving to arrest the downward movement of the latter before the apron is fully unwound.

2. In a fender, a flexible apron, a roller on which said apron is wound, a tubular casing in which said apron and its roller are contained, said casing having an opening through which the apron may be drawn, apron spreading arms pivotally supported at their rear ends and having the free margin of the apron connected therewith, a cross rod at the front extremities of said arms, means on said casing for engaging and upholding said cross rod when the apron is housed in said casing, supporting means for said casing permitting the latter upon contact with an object to yield backwardly and release said cross rod, a cylindrical housing fast on said apron roller, and an apron rewinding crank handle pivotally attached to and adapted to lie within said housing or be projected therefrom.

3. In a fender, a flexible apron, a roller on which said apron is wound, a tubular casing in which said apron and its roller are contained, said casing having an opening through which the apron may be drawn, apron spreading arms pivotally supported at their rear ends and having the free margin of the apron connected therewith, a solid cross rod at the front extremities of said arms, a flexible shock absorbing tube of metal surrounding said cross rod supported by said apron spreading arms and having an internal diameter sufficiently greater than the diameter of the cross rod to admit of transverse flexure of said tube, means on said casing for engaging and upholding said cross rod when the apron is housed in said casing, supporting means for said casing permitting the latter upon contact with an object to yield backwardly and release said cross rod, said cross rod serving as a stop for limiting the flexure of said tube.

In testimony whereof I affix my signature in presence of two witnesses.

AUGUST H. JURK.

Witnesses:
 CHARLES J. WOLTZ,
 CHARLES P. WOLTZ.